(12) United States Patent
Zur et al.

(10) Patent No.: US 11,693,698 B2
(45) Date of Patent: Jul. 4, 2023

(54) SYSTEM AND METHOD FOR INFRASTRUCTURE SCALING

(71) Applicant: NetApp, Inc., Sunnyvale, CA (US)

(72) Inventors: Tal Zur, Ramat Gan (IL); Ori Yemini, Hod Hasharon (IL)

(73) Assignee: NetApp, Inc., San Jose, CA (US)

(*) Notice: Subject to any disclaimer, the term of this patent is extended or adjusted under 35 U.S.C. 154(b) by 568 days.

(21) Appl. No.: 16/693,445

(22) Filed: Nov. 25, 2019

(65) Prior Publication Data
US 2020/0167199 A1 May 28, 2020

Related U.S. Application Data

(60) Provisional application No. 62/770,834, filed on Nov. 23, 2018.

(51) Int. Cl.
*G06F 9/46* (2006.01)
*G06F 9/50* (2006.01)

(52) U.S. Cl.
CPC .... *G06F 9/5011* (2013.01); *G06F 2209/5019* (2013.01)

(58) Field of Classification Search
CPC ............ G06F 9/5011; G06F 30/27; G06F 2209/5019; G06N 20/00
See application file for complete search history.

(56) References Cited

U.S. PATENT DOCUMENTS

| | | | |
|---|---|---|---|
| 9,477,503 B2* | 10/2016 | Masuda | G06F 9/5077 |
| 10,678,573 B2* | 6/2020 | Shah | G06F 9/45533 |
| 2014/0282520 A1* | 9/2014 | Sabharwal | G06F 9/455 |
| | | | 718/1 |

FOREIGN PATENT DOCUMENTS

WO  WO-2016178316 A1 * 11/2016 ......... G06F 9/45558

OTHER PUBLICATIONS

Borkowski et al., Predicting Cloud Resource Utilization, ACM, 2016, pp. 37-42.*
Galante et al, A Survey on Cloud Computing Elasticity, IEEE, 2012, 8 pages.*
Yadwadkar, Machine learning for automatic resource management in the datacenter and the cloud, UCB/EECS, Aug. 10, 2018, 125 pages.*

* cited by examiner

*Primary Examiner* — Diem K Cao
(74) *Attorney, Agent, or Firm* — Haynes and Boone, LLP

(57) ABSTRACT

A method, system and computer program product, the method comprising: determining properties of a set of containers that are deployed over a computer infrastructure, wherein the computer infrastructure is provisioned via an infrastructure management service; determining properties of one or more headroom containers, wherein the one or more headroom containers are not deployed over the computer infrastructure; simulating the container orchestrator using the properties of the set of container and the properties of the headroom containers, for obtaining an expected deployment of the set of containers together with the one or more headroom containers; based on the expected deployment, determining whether the computer infrastructure is sufficient for deploying the set of containers together with the one or more headroom containers; and subject to the computer infrastructure being insufficient, issuing a request to the infrastructure management service to allocate additional computer infrastructure.

20 Claims, 3 Drawing Sheets

SYSTEM AND METHOD FOR INFRASTRUCTURE SCALING

CROSS-REFERENCE TO RELATED APPLICATION

This application claims the benefit of U.S. Provisional Application No. 62/770,834 filed Nov. 23, 2018, entitled "Pseudo Container Reservations for Infrastructure Scaling", which is hereby incorporated by reference in its entirety for all purposes, without giving rise to disavowment.

TECHNICAL FIELD

The present disclosure relates to infrastructure scheduling in general in general, and to a method and apparatus for scaling infrastructure for executing containers, in particular.

BACKGROUND

According to WIKIPEIDA, Cloud computing is the on-demand availability of computer system resources, especially data storage and computing power, without direct active management by the user. The term is generally used to describe data centers available to many users over the Internet. Large clouds, predominant today, often have functions distributed over multiple locations from central servers. If the connection to the user is relatively close, it may be designated an edge server. Clouds may be limited to a single organization (enterprise clouds), or be available to many organizations (public cloud). Cloud computing relies on sharing of resources to achieve coherence and economies of scale.

In some cases, cloud computing allows companies to avoid or minimize up-front IT infrastructure costs. In some cases, cloud computing allows enterprises to get their applications up and running faster, with improved manageability and less maintenance, and enables IT teams to more rapidly adjust resources to meet fluctuating and unpredictable demand.

The availability of high-capacity networks, low-cost computers and storage devices as well as the widespread adoption of hardware virtualization, service-oriented architecture and autonomic and utility computing has led to growth in cloud computing.

Current automatic infrastructure scaling for container-based workloads focuses on supplying the immediate needs of the workload as required by the container orchestrator. As containers are scheduled, a service controller monitors the requirements from the orchestrator and correlates that to the available infrastructure. If insufficient infrastructure exists to satisfy the scheduler requirements, a service controller then attempt to provision the underlying resources from a management service, in accordance with any requirements and constraints needed for successful container execution.

BRIEF SUMMARY

One exemplary embodiment of the disclosed subject matter is a method comprising: determining properties of a set of containers that are deployed over a computer infrastructure, wherein the computer infrastructure is provisioned via an infrastructure management service; determining properties of one or more headroom containers, wherein the one or more headroom containers are not deployed over the computer infrastructure; simulating the container orchestrator using the properties of the set of container and the properties of the headroom containers, for obtaining an expected deployment of the set of containers together with the one or more headroom containers; based on the expected deployment, determining whether the computer infrastructure is sufficient for deploying the set of containers together with the one or more headroom containers; and subject to the computer infrastructure being insufficient, issuing a request to the infrastructure management service to allocate additional computer infrastructure. Within the method, the properties of the set of containers and the properties of the headroom containers optionally include one or more items selected from the group consisting of: CPU consumption, memory space consumption and storage space consumption. Within the method, determining the properties of the set of containers is optionally performed subject to that the container orchestrator has determined a manner of deploying the set of containers over the computer infrastructure. Within the method, the properties of the one or more headroom containers are optionally determined dynamically. Within the method, the properties of the one or more headroom containers are optionally determined by a machine learning engine. Within the method, the properties of the one or more headroom containers are optionally determined based on historic data. Within the method, the properties of the one or more headroom containers are optionally determined based on prediction for future demand for additional containers. Within the method, the properties of the one or more headroom containers are optionally determined based on wake up time of the one or more containers. Within the method, the properties of the one or more headroom containers are optionally determined based on user provided requirements. Within the method, the properties of the one or more headroom containers are optionally determined based on user provided indications for cost and availability tradeoff. Within the method, the computer infrastructure is optionally cloud-based.

Another exemplary embodiment of the disclosed subject matter is a system having a processor, the processor being adapted to perform the steps of: determining properties of a set of containers that are deployed over a computer infrastructure, wherein the computer infrastructure is provisioned via an infrastructure management service; determining properties of one or more headroom containers, wherein the one or more headroom containers are not deployed over the computer infrastructure; simulating the container orchestrator using the properties of the set of container and the properties of the headroom containers, for obtaining an expected deployment of the set of containers together with the one or more headroom containers; based on the expected deployment, determining whether the computer infrastructure is sufficient for deploying the set of containers together with the one or more headroom containers; and subject to the computer infrastructure being insufficient, issuing a request to the infrastructure management service to allocate additional computer infrastructure. Within the system, the properties of the set of containers and the properties of the headroom containers optionally include one or more items selected from the group consisting of: CPU consumption, memory space consumption and storage space consumption. Within the system, determining the properties of the set of containers is optionally performed subject to that the container orchestrator has determined a manner of deploying the set of containers over the computer infrastructure. Within the system, the properties of the one or more headroom containers are optionally determined dynamically or based on user provided requirements. Within the system, the properties of the one or more headroom containers are optionally determined by a machine learning engine. Within the system, the properties of the one or more headroom containers are optionally determined based on prediction for future demand for additional containers. Within the system, the properties of the one or more headroom containers are optionally determined based on wake up time of the one or more containers. Within the system, the properties of the one or more headroom containers are optionally determined based on user provided indications for cost and availability tradeoff.

Yet another exemplary embodiment of the disclosed subject matter is a computer program product comprising a non-transitory computer readable medium retaining program instructions, which instructions when read by a processor, cause the processor to perform: determining properties of a set of containers that are deployed over a computer infrastructure, wherein the computer infrastructure is provisioned via an infrastructure management service; determining properties of one or more headroom containers, wherein the one or more headroom containers are not deployed over the computer infrastructure; simulating the container orchestrator using the properties of the set of container and the properties of the headroom containers, for obtaining an expected deployment of the set of containers together with the one or more headroom containers; based on the expected deployment, determining whether the computer infrastructure is sufficient for deploying the set of containers together with the one or more headroom containers; and subject to the computer infrastructure being insufficient, issuing a request to the infrastructure management service to allocate additional computer infrastructure.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
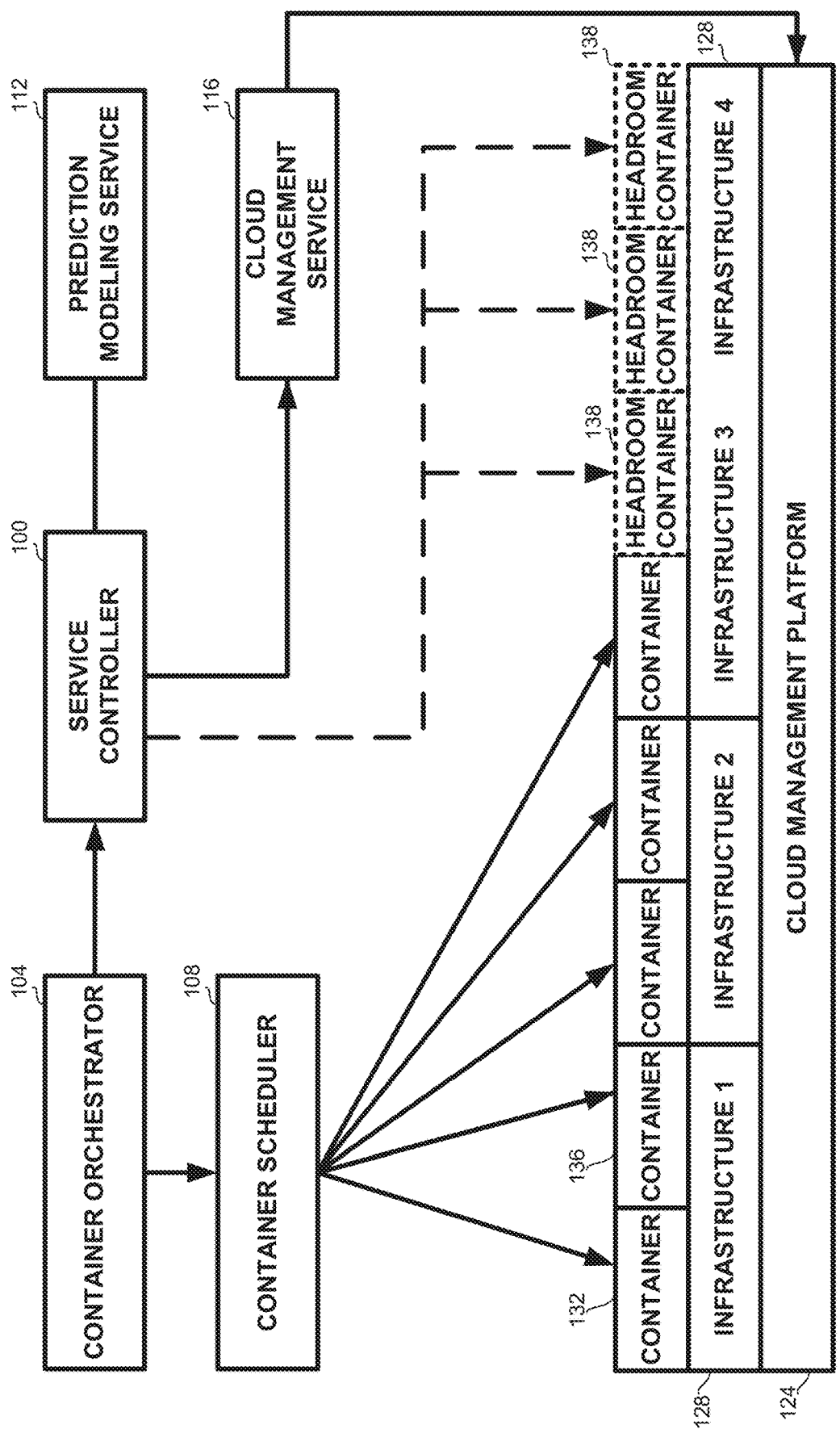
FIG. 1 shows a block diagram of the entities in the disclosure and an environment employing the disclosure, in accordance with some exemplary embodiments of the disclosed subject matter.

The term "container" used in this specification should be expansively construed to cover any unit of software that packages up application code and its dependencies, such as but not limited to system tools, system libraries and settings, so the application can be executed reliably on one or more computing platforms. In some exemplary embodiments, metadata of the container may define infrastructure requirements of the container for its execution. A container may be associated with metadata, also referred to as "properties", such as vCPU, memory, storage, bandwidth.

The term "container orchestrator", also referred to as "orchestrator", used in this specification should be expansively construed to cover any tool that manages the lifecycle of one or more containers in a container environment, including for example managing the infrastructure inventory and activities of assigning the containers. An orchestrator can, but is not limited to, perform any one or more of the following tasks: determining the properties of infrastructure required to meet the needs of currently executed containers, assigning and deploying containers to infrastructure, requesting or removing infrastructure in accordance with the requirements and any labels or constraints associated with positioning or relocating containers between infrastructure, allocating resources between containers, load balancing of resources between containers, monitoring the health of containers and hosts, or the like.

The term "orchestrator scheduler" used in this specification should be expansively construed to cover any tool that takes action based on instructions provided by the orchestrator. In some exemplary embodiments, the scheduler may associate container requirements with available infrastructure, and place containers for execution.

The term "infrastructure" used in this specification should be expansively construed to cover any set of resources used for executing one or more containers or parts thereof. An infrastructure unit may be associated with one or more values for a multiplicity of properties, such as CPU speed, available memory space, available storage space, communication speed, communication capacity, or other resources that a container can use for execution. An infrastructure unit may comprise any one or more physical computing platforms or parts thereof. A container scheduler may apply one or more constraints associated with containers, such as affinity or anti-affinity labels, indicating whether a container can or cannot be co-located with another container of a same type, of a different type, or the like. As an example, an affinity label may require that container of type A will always be placed in a same machine used to execute container of type B. As another example, an anti-affinity label may require that container of type A will never be located in the same machine as another container of type A. As yet another example, the affinity and anti-affinity labels may define a set of constraints requiring that container of type A needs to be placed together with at least one container of either types B and C, and cannot be placed where containers of types D and E are placed. In some cases, the metadata may be used by a container scheduler to find a suitable infrastructure to execute the container.

The term "headroom container" used in this specification should be expansively construed to cover a definition of a virtual executable unit. A headroom container has no specific code that needs to be executed, but is only characterized by its metadata, defining infrastructure requirements or properties. In some exemplary embodiments, headroom containers may be used for determining whether additional infrastructure are required to be provisioned to support expected future scaling.

The disclosed subject matter relates to provisioning both cloud and software defined infrastructure, for satisfying growth and scaling requirements of container workloads.

Container orchestrators, such as the orchestrators of KUBERNETES™, MESOS™, DOCKER SWARM™ and AWS ELASTIC CONTAINER SERVICE™, have the ability to schedule containers within a predetermined set of available infrastructure. The infrastructure devices may be characterized by properties including but not limited to virtual CPUs (vCPUs), Memory, Storage, and Network bandwidth. The properties may be further characterized by speed, type, size, or other specific attributes.

One technical problem dealt with by the disclosed subject matter is the need to enable container scaling for a cloud-based application. Currently, as containers scale, more resources may be required, requested, received and used. However, at a certain requirement level the available infrastructure resources may be exhausted, and no further scaling is enabled. At this stage, the orchestrator may attempt to reschedule containers, and may request additional infrastructure. Therefore, in cases of insufficient existing resources, the container orchestrator has to wait for the infrastructure to be provisioned before placing any new containers. Hence, there may be a stall between the container runtime request and the availability of infrastructure for execution, thus increasing waiting time and reducing the quality of service provided by the container. Between when the available infrastructure resources become exhausted and the time at which additional infrastructure resources sufficient for meeting the demands of the scheduled containers become available and the containers can be executed, the application performance may be degraded. For example, an application contained in the container can experience slowness, requests may be denied or fail due to creased load, and a lower and possibly unacceptable quality of service may be provisioned.

Another technical problem dealt with by the disclosed subject matter is to provide the infrastructure pre-provisioning by a third party that is potentially separate from the cloud management platform, the container orchestrator, or the like. It is noted that different orchestrators may handle the same set of containers with the same set of requirements differently, due to different underlying scheduling and orchestrating algorithms.

One technical solution comprises predicting and pre-provisioning additional infrastructure for containers, before capacity exhaustion is encountered. If sufficient infrastructure is available once it is needed, the system can scale quickly, thus reducing latency and maintaining the quality of service. The disclosure therefore relates to a service controller and additional components that provide for scaling infrastructure, such that it is available for supplying future demand.

Pre-provisioning the additional infrastructure which are not deployed over the infrastructure yet, may be performed by determining the properties of one or more headroom containers that will be required. The properties may be determined based on predicted future demand. Additionally, or alternatively, the container orchestrator may be continually polled for the properties of the set of containers for which the container orchestrator has already determined a manner of deploying over the computer infrastructure, as the container orchestrator requests and releases infrastructure. The predicted and current requirements can be accumulated, consolidated and provided to a simulation of the orchestrator, which can determine whether the currently available infrastructure is sufficient for provisioning the requirements. If the currently available infrastructure is insufficient and additional infrastructure is indeed required, the required headroom may be determined and requested from the infrastructure management platform, for example a cloud management platform. Thus, when the infrastructure is needed, applications that execute on top of a system using the headroom container reservations do not have to wait for resources to become available and capacity limits are not reached. The headroom containers may be described as a grouping of container requirements, which can include metadata such as vCPUs, memory, storage and any affinity or anti-affinity application labels.

In some exemplary embodiments, the extra required infrastructure may not be managed or handled by the container orchestrator, but rather by a dedicated service controller. Requiring the headroom provides a mechanism for the infrastructure to dynamically be ready for future container executions. These infrastructure reservations mimic actual container runtime requirements, thus reserving capacity that can be used instantly upon request from the orchestrator's scheduler.

Predicting the properties of the headroom container may be performed by an artificial intelligence engine, such as a machine learning engine and in particular a neural network, upon data of past activities, including for example identifying infrastructure requirement patterns, or the like. In some cases, seasonality may be accounted for, such as predicting higher load for traffic-related applications during rush hours in the weekdays, or predicting higher load for vacation-related services during spring break. A further aspect of the prediction may relate to the wake up time of different container types when executed on new infrastructure, which should be taken into account, such that the container can be functional as soon as the need arises.

Predicting the properties of the headroom container may refer to a time window, such as a minute, an hour, a day, a month, or the like, such that the request for additional infrastructure may be made in due time for the infrastructure to be ready in due time, but not too early, to avoid unnecessary costs.

Predicting the properties of the headroom container may depend on a tradeoff between the cost and provided service availability, as may be stated by a provider of the container. If availability is of greater importance than cost, then extra headroom containers may be requested, in order to avoid degraded service, while if cost is of higher importance, the minimal headroom containers may be requested, and as late as possible, to make the operation cost minimal.

In some embodiments, the properties of the headroom container may depend on user provided data indicating the properties of the infrastructure required to be reserved, rather than determined dynamically. In some embodiments, a user may state the maximal requirements for the headroom containers, for example not more than 5% of the currently available infrastructure.

In some embodiments, the containers to be scheduled may be associated with one or more imposed constraints, for example containers that should or should not be placed on the same device. Since the orchestrator will apply these constraints when scheduling the containers, the simulator also needs to consider the constraints, such that it obtains a realistic assessment of the required extra infrastructure.

The service controller, the simulator and additional components may be implemented to be used or communicate with one or more container orchestrators. In some embodiments, the service controller and the simulator may be implemented as plug-ins to one or more container orchestrator. In some embodiments, the service controller and the simulator may communicate with the container orchestrator using an Application Program Interface (API) of the container orchestrator or scheduler.

One technical effect of the disclosure relates to avoiding stalls or service degradation when containers are executed and upscale is required, thus improving the service. By requesting ahead of time the infrastructure that a container is predicted to need, the infrastructure becomes available and functional when needed and no further delays are experienced.

Another technical effect of the disclosure relates to predicting the required headroom containers, such that infrastructure is reserved in the required or afforded amount and time, thereby optimizing the container orchestrator operation, and avoiding access expenses on unrequired resources.

Yet another technical effect of the disclosure is that it can be used with any container orchestrator, for example using the container orchestrator API, and is not limited to a particular orchestrator. The disclosure can thus be applied to and become operative with any orchestrator or orchestrator change, without further changes.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1, showing a block diagram of the entities in the disclosed system and an environment employing the disclosure, in accordance with some exemplary embodiments of the disclosed subject matter.

The environment may comprise an infrastructure management platform such as a Cloud Management Platform 124, for managing the cloud provisioned infrastructure. Cloud Management Platform 124 can be a service such as AWS™, AZURE™ and GOOGLE GCP™ or on-premises solutions such as OPENSTACK™.

The cloud provisioned infrastructure may be arranged as Infrastructure Units 128, such as infrastructure 1, infrastructure 2, infrastructure 3 or infrastructure 4. Each such infrastructure unit may comprise one or more computing platforms or resources contained therein, or combinations thereof, for example certain amounts of CPU, memory, storage, network resources, or the like. Thus, it will be appreciated that an infrastructure is not necessarily contained within a single computing device, rather an infrastructure may be comprised of components of different machines, for example a CPU and memory of one device, and further memory of another device.

Each such infrastructure unit may execute thereon one or more containers, such as container 132, container 136, or the like. In some embodiments, a container may be executed by multiple infrastructures.

The environment may comprise a Container Orchestrator 104, such as KUBERNETES™, MESOS™, DOCKER SWARM™ and AWS ELASTIC CONTAINER SERVICE™. Container orchestrator 104 may determine the required infrastructure, upon the needs of the containers being executed. In some exemplary embodiments, Container Orchestrator 104 may be configured to map each container to a different Infrastructure Unit 108, based on the metadata thereof and the resources of Infrastructure Unit 108. For example. Container Orchestrator 104 may select a set of containers to be deployed in Infrastructure 1 (e.g., Containers 132, 136). The selection may be based on the constraints for the containers (e.g., required resources, constraints on affinity), the resources of the infrastructure, or the like. The selection may be an NP-complete problem, such as corresponding bin packing problem, multiprocessor scheduling, or the like. In some exemplary embodiments, the selection may be performed using a Constraint Satisfaction Problem (CSP) solver that is configured to solve a CSP comprising variables and domains thereof, and constraints over the variables.

Container Orchestrator 104 may provide the requirements to Container Scheduler 108, which may make the actual request for infrastructure and the allocation of containers to the infrastructure. Container Scheduler 108 may be comprised in Container orchestrator 104 or be operatively connected thereto.

Service Controller 100 may monitor Container Orchestrator 104, for example using an API of Container Orchestrator 104, for obtaining the properties of the used containers, e.g., the amount of used vCPU, memory, storage, or the like at any given time. Service Controller 100 may communicate with Prediction Modeling Service 112 to predict future infrastructure needs. Service Controller 100 may allocate headroom containers (e.g., Headroom Containers 138) to reserve infrastructure for future needs. Service Controller 100 may instruct Cloud Management Service 116 to provision the additional infrastructure accordingly.

Prediction Modeling Service 112 may be configured for predicting future requirements of the executed applications, expressed for example as a collection of properties as detailed above. The prediction may be provided statically, based for example on user defined parameters, indicating number of units of various resources to be reserved, percentage of the current resource consumption, or the like. Additionally or alternatively, the prediction may be made dynamically, and may use predictive models of future infrastructure needs, based on past usage data of Container Orchestrator 104 and container scheduler 108. Service Controller 100 may decide on property groupings and how many units may be added as Headroom Containers 138.

In some exemplary embodiments, the environment may comprise Cloud Management Service 116, which may be configured for accessing and making requests to Cloud Management Platform 124, based on instructions from Service Controller 100, and monitoring the infrastructure on the system side.

Service Controller 100 may be configured to accumulate and consolidate the current requirements as received from Container Orchestrator 104 and future requirements as received from Prediction Modeling Service 112 into one or more Headroom Containers 138. In some exemplary embodiments, a headroom container may be configured to match the metadata properties of several different types of potential containers. For example, given three types of potential containers that can be loaded by the application, two headroom containers may be defined to represent the three containers, so that if any one of the containers is loaded, there is a headroom container that represents its requirements. However, if all three containers are to be added at the same time, there may be insufficient infrastructure. In such an embodiment, a headroom container may be a superset of the metadata of the containers it represents. For example, one container type requires a low CPU requirement and a high memory requirement, while a second container type requires a high CPU requirement and a low memory requirement, the headroom container that is used to represent both containers may be defined using the high CPU requirement from the second container and the high memory requirement from the first container.

In some exemplary embodiments, Service Controller 100 may simulate the behavior of Container Orchestrator 104 for orchestrating all containers (e.g., 132, 136) as well as Headroom Containers 138, on the infrastructure available by Cloud Management Platform 124, to determine whether all containers can be scheduled with the currently available infrastructure, and a proposed deployment plan thereof. If not all requirements can be met, it may be determined that additional infrastructure is required to ensure the application can scale when required. In some exemplary embodiments, Service Controller 100 may issue a request comprising the expected extra infrastructure to Cloud Management Service 116. It is noted that Service Controller 100 may pre-fetch the extra infrastructure in a similar manner to the on-demand fetching of the extra infrastructure by Container Orchestrator 104, when there's insufficient infrastructure for the all the containers of an application.

If there is sufficient infrastructure, or alternatively, if additional infrastructure is provisioned to enable the provisioning of all containers—actual containers and headroom containers, Service Controller 100 may determine that there is a provisioning plan that can be implemented using the existing infrastructure. It is noted that Headroom Containers 138 may not actually be provisioned or deployed on Cloud Management Platform 124. Instead, they merely represent a potential of deploying other containers, when the need arises.

In some exemplary embodiments, when Container Orchestrator 104 encounters an increase in the required containers, if the increase matches the headroom containers, it may be assured that there's sufficient infrastructure to support the increased requirements. Illustratively, the containers may be placed instead of the headroom containers there were virtually assigned and scheduled by Service Controller 100. The newly placed containers may then be managed by Container Scheduler 108 as all previously allocated containers.

It is noted that the deployment of the containers (e.g. 132, 136) on Infrastructure Units 128 as planned by Container Orchestrator 104 and implemented by Container Scheduler 108 may be different than the plan devised by Service Controller 100, although Service Controller 100 simulates the behavior of Container Orchestrator 104. The difference in the deployment plan may be due to the fact that Container Scheduler 108 may devise a plan for a different set of containers—including only the actual containers and excluding Headroom Containers 138. As an example, and referring to the illustration of FIG. 1. Container Scheduler 108 may deploy a container on Infrastructure 4, although the plan, according to Service Controller 100 may indicate that only Headroom Containers 138 are deployed thereon.

Figure 2:
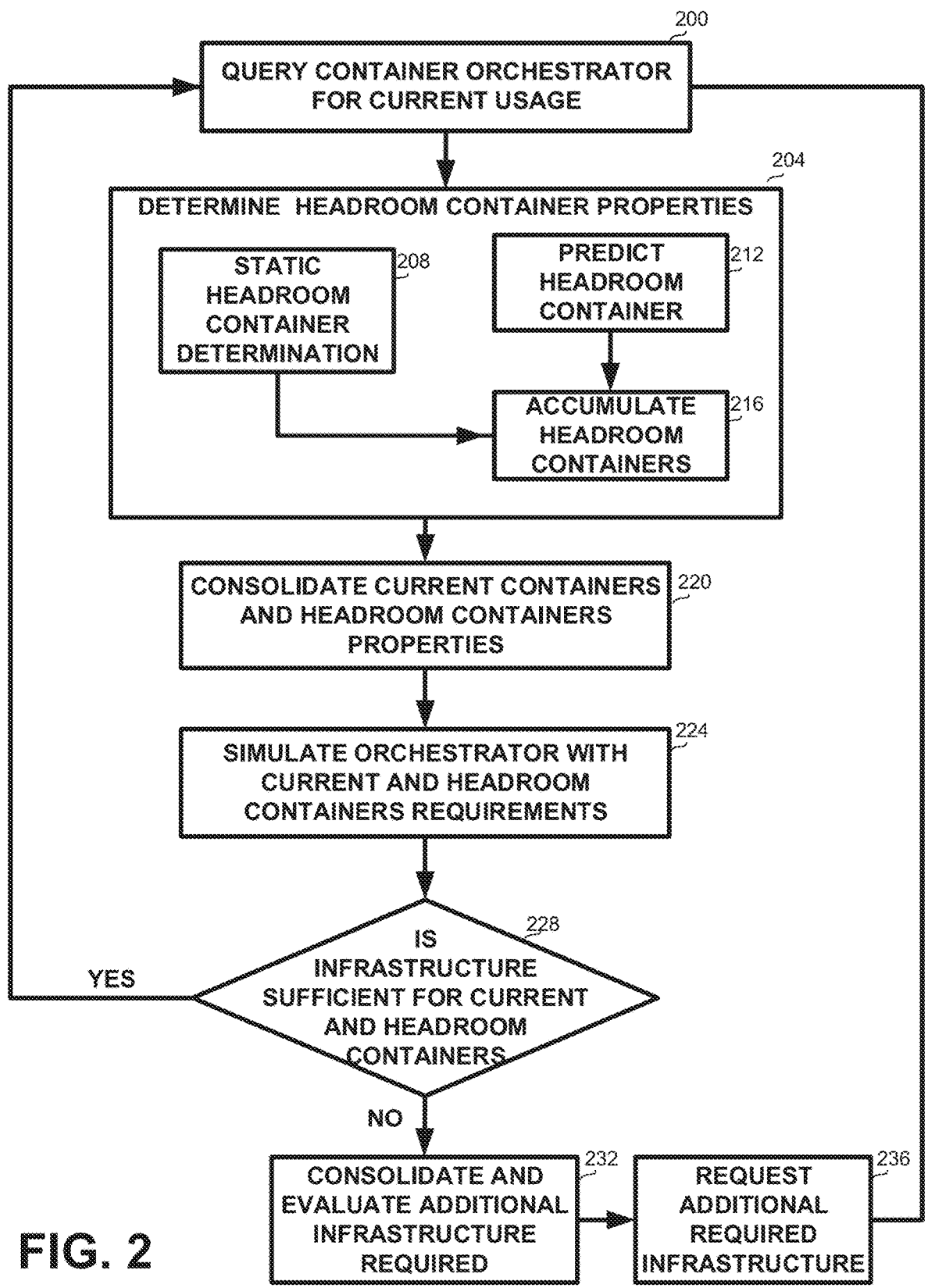
FIG. 2 shows a flowchart of a method for provisioning containers, in accordance with some embodiments of the disclosure.

Referring now to FIG. 2, showing a flowchart of a method for provisioning containers, in accordance with some embodiments of the disclosure.

On Step 200, Container Orchestrator 104 may be queried for its current usage of resources. Service Controller 100 may query Container Orchestrator 104 via an API, or in any other manner. In some exemplary embodiments, the current usage may include a list of deployed containers, metadata thereof, infrastructure utilization, or the like.

On Step 204, headroom container properties may be determined, for example by Prediction Modeling Service 112.

In some embodiments, on Step 208, static headroom container approach may be used, for example static headroom container properties may be determined, based for example on user provided data such as amount or percentage of required headroom.

Additionally or alternatively, headroom container properties may be determined dynamically by Prediction Modeling Service 112, which may utilize a prediction engine, such as an Artificial Neural Network, a regression model, a Support Vector Machine (SVM), or the like. A Prediction Modeling Service 112 may receive historic data of Container Orchestrator 104 and Container Scheduler 108, and by determining connections, weights, rules, patterns or the like may predict future usage, for example within the following time frame. The time frame may be, for example, ten minutes, one hour, 6 hours, one day, or the like. Prediction Modeling Service 112 may provide one or more sets of headroom container parameters, for example a first set comprising vCPU, memory and storage requirements, and a second set comprising possibly different vCPU, memory and storage requirements.

On Step 216, the predicted headroom containers may be accumulated. For example, two or more storage requirements may be accumulated to a single requirement, e.g. headroom container, or the like. In some embodiments, static prediction and dynamic prediction may occur, for example some properties may be predicted statically and others dynamically. In these embodiments, the static and dynamic requirements may also be accumulated.

On Step 220, the current containers properties as received on Step 200 and the predicted properties as obtained on Step 204 may be accumulated and consolidated to obtain the total requirement properties. Consolidation may optimize the properties allocation, and reduce overhead. Consolidation and optimization may conform to the container constraints, such as which containers must, can or cannot be executed on the same infrastructure.

On Step 224, a simulator of the container orchestrator may be provided with the accumulated and consolidated requirements, and may determine whether the currently available resources are sufficient for provisioning and providing the requirements of the containers and the headroom containers, i.e., whether additional resources are expected to be required based on the prediction. In some embodiments, the containers and headroom containers may be provided to the simulator one at a time and a response may indicate whether all headroom containers provided so far can be provisioned. In alternative embodiments, all containers and headroom containers may be provided at once, and a response may indicate whether all headroom containers can be provisioned or not. Optionally, if not all the requirements can be provisioned, the simulator may respond which containers or headroom containers cannot be provisioned. The simulator may also take into account the constraints imposed on the containers and headroom containers, such as which ones must, can, or cannot be executed by the same infrastructure. It will be appreciated that the simulator does not allocate infrastructure for the headroom containers, but rather checks if such allocation is feasible. In some embodiments, the simulator may build a virtual allocation model, to be used when actual allocation of the headroom containers is done, thus providing for efficient and immediate provisioning.

In some exemplary embodiments, the simulator may be selected from a set of alternative simulators, each of which corresponding to a different container orchestrator. For example, there may be separate and different simulators for simulating the operation of KUBERNETES™, of MESOS™, of DOCKER SWARM™ and of AWS ELASTIC CONTAINER SERVICE™. In some exemplary embodiments, the selection may be for a simulator that best matches the orchestrator utilized by the system and which was contacted in Step 200. Additionally or alternatively, there may be a general simulator for simulating container provisioning that may be used if there is no brand-specific simulator for the utilized orchestrator.

If the available infrastructure is sufficient, execution may return to Step 200 for another iteration. It will be appreciated that iterations may repeat in an ongoing manner, every predetermined period of time, such as one minute, ten minutes, one hour or the like. Also, the iteration rate may depend on whether the infrastructure is sufficient or not, and may change accordingly.

If the infrastructure is insufficient, then on Step 232 the additional required infrastructure may be determined. The grouping of resources for allocation may be based on historical trends and combined with machine learning. In some embodiments, it may be determined whether some of the properties of the headroom containers can fit in the existing infrastructure, and how to group the required properties and allocate infrastructure for the headroom containers.

On Step 236, Cloud Management Service 116 may request the additional infrastructure from Cloud Management Platform 124, and may maintain indications of their association with the headroom containers. Cloud Management Platform 124 may initialize or take any other action required for preparing the infrastructure, such that it can be operative as soon as it is needed.

Thus, when Container Orchestrator 104 runs short of infrastructure and cannot schedule all containers within the available infrastructure, the infrastructure associated with the headroom containers may be provided and used without further delays.

After Step 236 is performed, another iteration may commence at Step 200. Additionally or alternatively, Step 224 may be performed to ensure that after the additional infrastructure is added, the allocated infrastructure is sufficient to support the containers and headroom containers.

Figure 3:
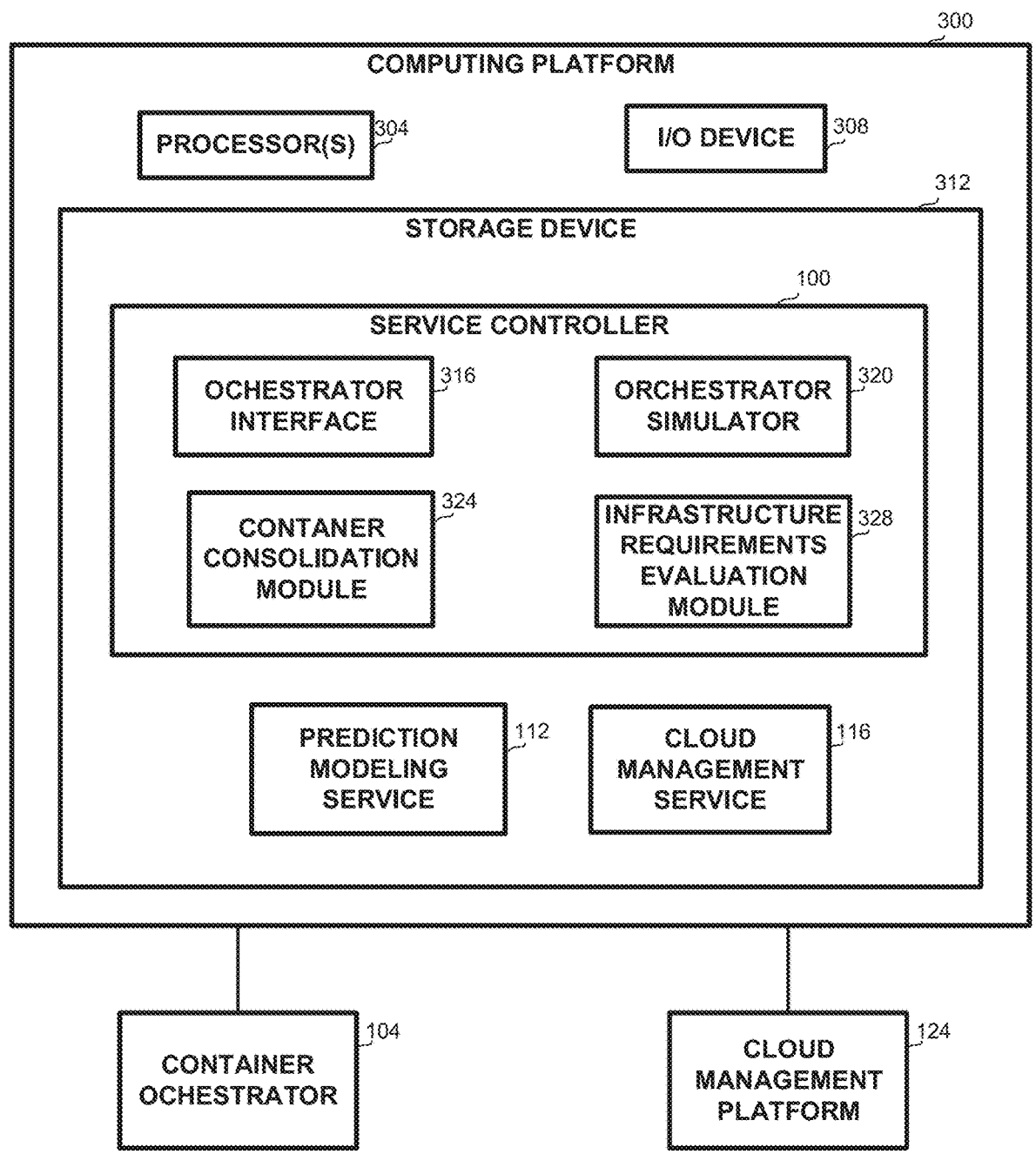
FIG. 3 shows a block diagram of system configured for provisioning containers, in accordance with some embodiments of the disclosure.

Referring now to FIG. 3, showing a block diagram of system configured for provisioning containers, in accordance with some embodiments of the disclosure.

The system may comprise one or more Computing Platforms 300. In some embodiments, Computing Platform 300 may be a server, and may provide services to one or more clients. In further embodiments.

Computing Platform 300 may communicate with other computing platforms via any communication channel, such as a Wide Area Network, a Local Area Network, intranet, Internet or the like.

Computing Platform 300 may comprise a Processor 304 which may be one or more Central Processing Units (CPU), a microprocessor, an electronic circuit, an Integrated Circuit (IC) or the like. Processor 304 may be configured to provide the required functionality, for example by loading to memory and activating the modules stored on Storage Device 312 detailed below.

It will be appreciated that Computing Platform 300 may be implemented as one or more computing platforms which may be operatively connected to each other. It will also be appreciated that Processor 304 may be implemented as one or more processors, whether located on the same platform or not.

Computing Platform 300 may comprise Input/Output (I/O) Device 308 such as a display, a pointing device, a keyboard, a touch screen, or the like. I/O Device 308 may be utilized to receive input from and provide output to a user, for example receive headroom properties from a user, display to the user data such as infrastructure utilization or cost, or the like.

Computing Platform 300 may comprise a Storage Device 312, such as a hard disk drive, a Flash disk, a Random Access Memory (RAM), a memory chip, or the like. In some exemplary embodiments, Storage Device 312 may retain program code operative to cause Processor 304 to perform acts associated with any of the modules listed below, or steps of the method of FIG. 2 above. The program code may comprise one or more executable units, such as functions, libraries, standalone programs or the like, adapted to execute instructions as detailed below.

Storage Device 312 may comprise Service Controller 100, Prediction Modeling Service 112 described in association with FIG. 1, and Cloud Management Service 116 also described in association with FIG. 1.

In some embodiments, Service Controller 100 may be implemented as a part of, or as a plug-in to Container Orchestrator 104. In such embodiments, the components detailed below may be executed from within an environment of Container Orchestrator 104.

Service Controller 100 may comprise Orchestrator Interface 316, for communicating with Container Orchestrator 104 and/or Container Scheduler 108, for example via an API, data streams, files, or the like, addressing queries related to past and present orchestration and scheduling of containers, receiving responses, or the like.

Service Controller 100 may comprise one or more Orchestrator Simulators 320 for receiving a collection of current containers, or at least properties thereof such as required resources, and a collection of properties of headroom containers, and receive an indication of whether the simulated orchestrator can schedule the current and headroom containers into the currently available infrastructure. Orchestrator Simulator 320 can operate by utilizing a corresponding API of Container Orchestrator 104, by being programmed in accordance with the paradigms and algorithms of Container Orchestrator 104, or as a machine learning engine trained upon past scheduling operations of Container Orchestrator 104.

It will be appreciated that a system in accordance with the disclosure can operate in conjunction with multiple containers orchestrators. Thus, multiple simulators may be provided, each simulating the operation of a different container orchestrator.

It will be appreciated that a simulator may maintain an in-memory virtualized model of the currently executed containers, rather than affecting the live environment.

Service Controller 100 may comprise Container Consolidation Module 324 for consolidating a multiplicity of container requirements, stemming from currently executed containers and predicted headroom containers.

Service Controller 100 may comprise Infrastructure Requirements Evaluation Module 324 for evaluating the properties of the required headroom container in case the currently available infrastructure is insufficient. A request to allocate the properties of the required headroom may then be provided to cloud management service 116.

It will be appreciated that one or more functionalities of Service Controller 100, for example consolidating the requirements for assessing the properties of the headroom containers, may be performed by modules, such as machine learning modules executed by a remote computing device.

Exemplary Embodiment

The term "Pod" used in this example should be expansively construed to cover any group of one or more containers, optionally sharing storage and/or network, and a specification for how to run the containers. A pod's contents may be co-located and co-scheduled, and run in a shared context.

In an exemplary embodiment, a currently employed configuration is obtained from a KUBERNETES™ scheduler, running pods, deployments, replica sets, with any taints and tolerations. Using collected historic execution data of the of the respective pod definitions, and user requirements of cost vs availability, the orchestrator scheduler provides a projected headroom allocation. The process starts by evaluating all deployments, and determining whether headroom is needed. If headroom is deemed necessary for a respective deployment, the number of headroom units may be calculated. This is demonstrated in the following settings:

```
{
  "dev3.alpha-sense.org::platform-alerts::se-solrcloud-k8": 3,
  "dev3.alpha-sense.org::research::theme-sueeestion-scorer": 0,
  "dev3.alpha-sense.org::applications::se-snippets-ws": 0,
  "dev3.alpha-sense.org::shard-test::doc-search-shard": 0,
  "dev3.alpha-sense.org::websocket-ingress::websocket-ingress-nginx-ingress-controller": 0,
  "dev3.alpha-sense.org::research::theme-suggestion-indexer-reprocessing-indexer": 0,
  "dev3.alpha-sense.org::applications::fe-html-pdf-converter": 1,
  "dev3.alpha-sense.org::applications::fingerprint-ws": 0,
  "dev3.alpha-sense.org::applications::entity-userdata-ws": 0,
  "dev3.alpha-sense.org::applications::owler-modules-sync": 0,
  "dev3.alpha-sense.org::research::ts-document-level-themes": 0,
  "dev3.alpha-sense.org::platform-search::se-solrcloud-router": 1,
  "dev3.alpha-sense.org::platform::as-amr-brokers": 0,
  "dev3.alpha-sense.org::nyksy-test::theme-suggestion-test-scorer": 0,
  "dev3.alpha-sense.org::platform::suggestions-ws": 0,
  "dev3.alpha-sense.org::applications::graphql-entity": 1,
  "dev3.alpha-sense.org::applications::dp-pdftohtmlconverter-trssr": 1,
  "dev3.alpha-sense.org::applications::alert-stream-persister": 1,
  "dev3.alpha-sense.org::applications::kong": 0,
  "dev3.alpha-sense.org::applications::alert-email-builder": 0,
  "dev3.alpha-sense.org::research::suggestion-context": 1,
  "dev3.alpha-sense.org::applications::vixen-fe-document-ws": 1,
  "dev3.alpha-sense.org::applications::be-txtdata-api": 0,
  "dev3.alpha-sense.org::platform::hit-content": 0,
  "dev3.alpha-sense.org::platform::document-data-service-history": 7,
  "dev3.alpha-sense.org::research::ts-doc-themes-reprocessing": 0,
  "dev3.alpha-sense.org::applications::fe-brokerresearch-ws": 1,
  "dev3.alpha-sense.org::research::theme-suggestion-indexer": 2,
  "dev3.alpha-sense.org::nyksy-test::theme-suggestion-test-indexer": 0,
  "dev3.alpha-sense.org::research::re-prep-gpu": 0,
  "dev3.alpha-sense.org::research::re-prep-cpu": 0,
  "dev3.alpha-sense.org::applications::snippets-alerts": 0,
  "dev3.alpha-sense.org::applications::batch-alerts-processor": 0,
  "dev3.alpha-sense.org::applications::legacy-sv-buffy": 0,
  "dev3.alpha-sense.org::applications::ticker-batch": 6,
  "dev3.alpha-sense.org::applications::event-parsing-service": 0,
  "dev3.alpha-sense.org::applications::mobile-alerts-notifier": 2,
  "dev3.alpha-sense.org::applications::fe-edit-ws": 0,
  "dev3.alpha-sense.org::nyksy-test::theme-suggestion-test-api": 0,
  "dev3.alpha-sense.org::applications::legacy-sv": 0,
  "dev3.alpha-sense.org::research::entity-rec-ner": 1,
  "dev3.alpha-sense.org::applications::legacy-sv-megatron": 0,
  "dev3.alpha-sense.org::platform-search::se-solrcloud-k8": 0,
  "dev3.alpha-sense.org::integrations::as-sync-sharepoint": 3,
  "dev3.alpha-sense.org::applications::legacy-sv-marvel": 0,
  "dev3.alpha-sense.org::platform::se-useractivity-ws": 1,
  "dev3.alpha-sense.org::applications::fe-document-ws": 1,
  "dev3.alpha-sense.org::applications::legacv-sv-angledust": 0,
  "dev3.alpha-sense.org::applications::legacy-sv-elektra": 0,
  "dev3.alpha-sense.org::applications::doc-search": 2,
  "dev3.alpha-sense.org::platform::sentiment-data": 1,
  "dev3.alpha-sense.org::applications::lnsources-ui": 2,
  "dev3.alpha-sense.org::applications::table-object-data-ws": 0,
  "dev3.alpha-sense.org::kube-system::kube-dns": 2,
  "dev3.alpha-sense.org::platform::se-usercontent-resolver": 0,
  "dev3.alpha-sense.org::applications::entitlement": 0,
  "dev3.alpha-sense.org::applications::master-ticker-delta-publisher": 3,
  "dev3.alpha-sense.org::dogging::loki-distributor": 0,
  "dev3.alpha-sense.org::default::zalenium": 0,
  "dev3.alpha-sense.org::applications::legacy-sv-thanos": 0,
  "dev3.alpha-sense.org::applications::legacy-sv-development": 0,
  "dev3.alpha-sense.org::applications::em-admin-backend": 0,
  "dev3.alpha-sense.org::platform::document-data-service-put": 6,
  "dev3.alpha-sense.org::applications::company-id-mapper": 0,
  "dev3.alpha-sense.org::applications::topictaxonomy": 1,
  "dev3.alpha-sense.org::applications::dp-userdoc-migration": 0,
  "dev3.alpha-sense.org::research::cnr4brat": 0,
  "dev3.alpha-sense.org::applications::suggestion-context-reprocess": 0,
  "dev3.alpha-sense.org::applications::fe-webclipper-ws": 0,
  "dev3.alpha-sense.org::nvksy-test::as-client-reporting": 0,
  "dev3.alpha-sense.org::platform::query-validator-service": 0,
  "dev3.alpha-sense.org::applications::tablex-processing-ws": 1,
  "dev3.alpha-sense.org::applications::countries": 1,
```

-continued

```
"dev3.alpha-sense.org::applications::table-stitching-ws": 2,
"dev3.alpha-sense.org::applications::alert": 0,
"dev3.alpha-sense.org::platform-alerts::se-indexing-orchestrator-ws": 0,
"dev3.alpha-sense.org::applications::extended-history": 0,
"dev3.alpha-sense.org::monitoring::custom-metrics-apiserver": 0,
"dev3.alpha-sense.org::applications::dp-userdocprocessing-operational": 1,
"dev3.alpha-sense.org::applications::ticker": 2,
"dev3.alpha-sense.org::platform::auth-ws": 0,
"dev3.alpha-sense.org::platform::se-indexing-orchestrator-ws": 0,
"dev3.alpha-sense.org::logging::efk-es-master-nodes": 0,
"dev3.alpha-sense.org::research::re-sentiment-context": 14,
"dev3.alpha-sense.org::applications::entity-ws": 2,
"dev3.alpha-sense.org::applications::gics-industries": 0,
"dev3.alpha-sense.org::platform-search::solr-prometheus-exporter-router": 0,
"dev3.alpha-sense.org::applications::legacy-sv-batman": 0,
"dev3.alpha-sense.org::platform::document-data-service-get": 7,
"dev3.alpha-sense.org::platform::rerun-service": 0,
"dev3.alpha-sense.org::applications::dp-publicdocprocessing-operational": 4,
"dev3.alpha-sense.org::platform-search::solr-prometheus-exporter-solrcloud": 0,
"dev3.alpha-sense.org::applications::dp-factsetssr-addbroker": 0,
"dev3.alpha-sense.org::integrations::fe-evernote-sync": 0,
"dev3.alpha-sense.org::integrations::watchlist-receiver": 0,
"dev3.alpha-sense.org::applications::dable-export-ws": 1,
"dev3.alpha-sense.org::logging::loki-querier": 0,
"dev3.alpha-sense.org::monitoring::thanos-store": 0,
"dev3.alpha-sense.org::applications::remote-api": 0,
"dev3.alpha-sense.org::applications::dp-publicdocprocessing": 6,
"dev3.alpha-sense.org::applications::extended-history-with-batch-processing": 1,
"dev3.alpha-sense.org::platform-alerts::se-zookeeper-k8": 0,
"dev3.alpha-sense.org::research::theme-suggestion-indexer-indexer": 0,
"dev3.alpha-sense.org::platform::user-service": 1,
"dev3.alpha-sense.org::research::pb-sentiment": 5,
"dev3.alpha-sense.org::applications::fe-html-to-pdf-ws": 1,
"dev3.alpha-sense.org::applications::amr-management": 0,
"dev3.alpha-sense.org::applications::legacy-sv-vixen": 0,
"dev3.alpha-sense.org::applications::dp-userdocprocessing": 2,
"dev3.alpha-sense.org::platform::feature-storage": 0,
"dev3.alpha-sense.org::platform::snippets": 0,
"dev3.alpha-sense.org::logging::elastic-operator": 0,
"dev3.alpha-sense.org::applications::sentiment-ws": 1,
"dev3.alpha-sense.org::applications::legacy-sv-thor": 0,
"dev3.alpha-sense.org::applications::document-types": 0,
"dev3.alpha-sense.org::applications::extended-enricher": 0,
"dev3.alpha-sense.org::monitoring::thanos-compactor": 0,
"dev3.alpha-sense.org::applications::ios-service": 1,
"dev3.alpha-sense.org::applications::document-viewer": 0,
"dev3.alpha-sense.org::applications::tr-groupuid": 0,
"dev3.alpha-sense.org::platform-search::se-zookeeper-k8": 0,
"dev3.alpha-sense.org::integrations::fe-onenote-sync": 2,
"dev3.alpha-sense.org::applications::event-logging-service": 0,
"dev3.alpha-sense.org::applications::entity-master-listener": 0,
"dev3.alpha-sense.org::applications::motifier": 0,
"dev3.alpha-sense.org::applications::doc-search-ddspoc": 0,
"dev3.alpha-sense.org::applications::app-saved-search": 1,
"dev3.alpha-sense.org::monitoring::stable-prometheus-server": 0,
"dev3.alpha-sense.org::applications::lexis-nexis-sources": 0,
"dev3.alpha-sense.org::logging::efk-kb": 0,
"dev3.alpha-sense.org::applications::table-detection-ws": 1,
"dev3.alpha-sense.org::applications::dp-pdftohtmlconverter": 0,
"dev3.alpha-sense.org::applications::tablex-presentation-ws": 2,
"dev3.alpha-sense.org::research::entity-rec": 1,
"dev3.alpha-sense.org::applications::entity-master-document-reprocessor-ws": 0,
"dev3.alpha-sense.org::applications::legacy-sv-hulk": 0,
"dev3.alpha-sense.org::applications::legacy-sv-lythong": 0,
"dev3.alpha-sense.org::applications::dp-blackline": 1,
"dev3.alpha-sense.org::research::theme-extraction-service-xxl": 2,
"dev3.alpha-sense.org::research::theme-extraction-service": 3,
"dev3.alpha-sense.org::usage::as-client-reporting": 0,
"dev3.alpha-sense.org::applications::app-snippets": 0,
"dev3.alpha-sense.org::dogging::efk-es-data-nodes": 0,
"dev3.alpha-sense.org::platform-alerts::alert-ws": 0
}
```

The settings above combine historical data along with replica history to predict what the next scaling activity will need. This data may then be restricted by the orientation of the customer. For example, for customers that choose cost savings, no more than 5% of the infrastructure will be added to the total cluster at any given time. For customers set to full availability orientation, up to 50% may be added. In the current example, cost savings is configured and headroom is capped at 5% of the existing cluster size. In the snippet below, the reduced set of necessary headroom units is shown, prioritized by scaling needs and limited to 5% overall cluster growth.

```
{
    "dev3.alpha-sense.org::applications::ticker-batch": {
        "cpuPerUnit": 500,
        "memoryPerUnit": 2560,
        "numOfUnits": 3,
        "gpuPerUnit": 0
    },
    "dev3.alpha-sense.org::platform::document-data-service-put": {
        "cpuPerUnit": 1000,
        "memoryPerUnit": 4096,
        "numOfUnits": 4,
        "gpuPerUnit": 0
    },
    "dev3.alpha-sense.org::applications::dp-publicdocprocessing": {
        "cpuPerUnit": 4000,
        "memoryPerUnit": 20480,
        "numOfUnits": 2,
        "gpuPerUnit": 0
    },
    "dev3.alpha-sense.org::research::re-sentiment-context": {
        "cpuPerUnit": 500,
        "memoryPerUnit": 1024,
        "numOfUnits": 4,
        "gpuPerUnit": 0
    },
    "dev3.alpha-sense.org::research::pb-sentiment": {
        "cpuPerUnit": 700,
        "memoryPerUnit": 500,
        "numOfUnits": 5,
        "gpuPerUnit": 0
    }
}
```

The headroom containers may then be used to determine whether the existing capacity in the cluster is sufficient, or if additional computer infrastructure is needed from the cloud provider. A required headroom container may have a specific property, for example "headroomPods", which may identify excess space in the cluster for headroom until no more pseudo containers can be placed. The unallocated containers may then be provided to the cloud management service for provisioning the necessary capacity. The resulting allocation will allow the simulation to place the headroom container on the new node and the cluster will be at 100% capacity for both currently scheduled nodes as well as headroom for future growth.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a". "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   determining first properties of one or more containers that are deployed over a computer infrastructure provisioned via an infrastructure management service;
   determining second properties of one or more headroom containers, wherein the one or more headroom containers are not deployed over the computer infrastructure;
   simulating a container orchestrator using the first properties and the second properties to obtain an expected deployment of the one or more containers together with the one or more headroom containers;
   based on the expected deployment, determining whether the computer infrastructure is sufficient for deploying the one or more containers together with the one or more headroom containers;
   in response to the computer infrastructure being insufficient, issuing a request to the infrastructure management service to allocate additional computer infrastructure to associate with the one or more headroom containers; and
   maintaining the association between the allocated additional computer infrastructure with the one or more headroom containers until the allocated additional computer infrastructure is provided to the one or more containers deployed over the computer infrastructure.

2. The method of claim 1, wherein the first properties of the one or more containers and the second properties of the one or more headroom containers include one or more of CPU consumption, memory space consumption, or storage space consumption.

3. The method of claim 1, wherein the determining the first properties of the one or more containers is performed subject to a determination of a manner of deploying the one or more containers over the computer infrastructure.

4. The method of claim 1, wherein the determining the second properties of the one or more headroom containers comprises dynamically determining the second properties.

5. The method of claim 1, wherein the second properties of the one or more headroom containers are determined by a machine learning engine.

6. The method of claim 1, wherein the second properties of the one or more headroom containers are determined based on historic data.

7. The method of claim 1, wherein the second properties of the one or more headroom containers are determined based on a prediction for future demand for additional containers.

8. The method of claim 1, wherein the second properties of the one or more headroom containers are determined based on a wake up time of the one or more headroom containers.

9. The method of claim 1, wherein the second properties of the one or more headroom containers are determined based on one or more of a user provided requirement or a user provided indication for cost and availability tradeoff.

10. The method of claim 1, wherein the computer infrastructure is cloud-based.

11. The method of claim 1, wherein:
    the one or more headroom containers comprises a plurality of headroom containers, and
    the second properties comprises a first property and a second property.

12. The method of claim 11, further comprising:
    accumulating, as a superset of the second properties of the plurality of headroom containers, the first property of one of the plurality of headroom containers having a first most demanding requirement from among the plurality of headroom containers, and the second property of another one of the plurality of headroom containers having a second most demanding requirement from among the plurality of headroom containers; and using the accumulated first property and the accumulated second property in the simulating.

13. A computing device, comprising:

a memory containing machine readable medium comprising machine executable code having stored thereon instructions for performing a method of scaling a computer infrastructure; and a processor coupled to the memory, the processor configured to execute the machine executable code to cause the processor to:

determine a first property of one or more containers that are deployed over the computer infrastructure;

determine a second property of one or more headroom containers that remain undeployed over the computer infrastructure;

simulate a container orchestrator using an aggregation of the first property and the second property to determine an expected deployment of a combination of the one or more containers and the one or more headroom containers;

based on the expected deployment, determine whether the computer infrastructure is sufficient for deploying the combination of the one or more containers and the one or more headroom containers;

in response to determining that the computer infrastructure is insufficient, issue a request to an infrastructure management service to allocate additional computer infrastructure to associate with the one or more headroom containers; and maintain the association between the allocated additional computer infrastructure with the one or more headroom containers until the allocated additional computer infrastructure is provided to the one or more containers deployed over the computer infrastructure.

14. The computing device of claim 13, wherein the first property of the one or more containers and the second property of the one or more headroom containers include one or more of CPU consumption, memory space consumption, or storage space consumption.

15. The computing device of claim 13, wherein the processor is further configured to:

perform the determination of the first property of the one or more containers subject to a determination of a manner of deploying the one or more containers over the computer infrastructure.

16. The computing device of claim 13, wherein the second property of the one or more headroom containers is determined dynamically.

17. The computing device of claim 13, wherein the second property of the one or more headroom containers is determined by a machine learning engine.

18. The computing device of claim 13, wherein the second property of the one or more headroom containers is determined based on a prediction for future demand for one or more additional containers.

19. A non-transitory machine readable medium having stored thereon instructions for performing a method of scaling a computer infrastructure, comprising machine executable code which when executed by at least one machine, cause the at least one machine to:

simulate a container orchestrator using a combination of a first property of one or more containers deployed over the computer infrastructure and a second property of one or more headroom containers that remain undeployed over the computer infrastructure;

obtain, from the simulation, an expected deployment of a combination of the one or more containers and the one or more headroom containers;

based on the expected deployment, determine whether the computer infrastructure is sufficient for deploying the combination of the one or more containers and the one or more headroom containers; and in response to determining the computer infrastructure is insufficient, issue a request to allocate additional computer infrastructure to associate with the one or more headroom containers; and maintain the association between the allocated additional computer infrastructure with the one or more headroom containers until the allocated additional computer infrastructure is provided to the one or more containers deployed over the computer infrastructure.

20. The non-transitory machine readable medium of claim 19, further comprising machine executable code that causes the at least one machine to:

define metadata of the one or more headroom containers to represent one or more metadata properties of one or more different types of potential containers that can be loaded.

* * * * *